United States Patent [19]

Nishimura

[11] Patent Number: 4,868,385
[45] Date of Patent: Sep. 19, 1989

[54] ROTATING STATE DETECTION APPARATUS USING A PLURALITY OF LIGHT BEAMS

[75] Inventor: Tetsuharu Nishimura, Kawasaki, Japan

[73] Assignee: Canon Kabushiki Kaisha, Tokyo, Japan

[21] Appl. No.: 196,850

[22] Filed: May 17, 1988

Related U.S. Application Data

[63] Continuation of Ser. No. 883,052, Jul. 8, 1986, abandoned.

[30] Foreign Application Priority Data

Jul. 10, 1985 [JP] Japan .................. 60-152066

[51] Int. Cl.⁴ .................................. H01J 3/14
[52] U.S. Cl. .................. 250/231 SE; 250/237 G
[58] Field of Search ............... 250/231 SE, 237 G; 340/347 P; 324/175; 356/356

[56] References Cited

U.S. PATENT DOCUMENTS

| | | | |
|---|---|---|---|
| 3,493,959 | 2/1970 | Cap | 340/347 P |
| 3,726,595 | 4/1973 | Matsumoto | 356/111 |
| 3,756,723 | 9/1973 | Hock | 250/237 G |
| 3,833,299 | 9/1974 | Lang | 250/237 G |
| 4,676,645 | 6/1987 | Taniguchi et al. | 356/356 |

FOREIGN PATENT DOCUMENTS

| | | |
|---|---|---|
| 5047 | 4/1972 | Japan. |
| 207805 | 2/1982 | Japan. |
| 190202 | 3/1982 | Japan. |
| 190203 | 9/1982 | Japan. |
| 58-191906 | 11/1983 | Japan. |
| 58-191907 | 11/1983 | Japan. |

OTHER PUBLICATIONS

Journal of Electronic Engineering, "High-Precision, Compact Rotary Encoder Uses Semiconductor Laser", pp. 50-51 (Feb. 1986).
1986 Precision Engineering Association Spring Meeting, pp. 5-6 (Mar. 1986).

Primary Examiner—Edward P. Westin
Assistant Examiner—Khaled Shami
Attorney, Agent, or Firm—Fitzpatrick, Cella, Harper & Scinto

[57] ABSTRACT

A rotating state detection apparatus comprising, an optical device for detecting coherent beams toward a plurality of positions on a diffraction grating present along a rotational direction of a rotating object, an interfering device for superposing diffraction beams of a specific order with each other, the diffraction beams being diffracted at the plurality of different positions on the diffraction grating, and light-receiving device for receiving the superposed beams obtained by the interfering device, and for photoelectrically converting interference fringes formed by the superposed beams.

38 Claims, 3 Drawing Sheets

ROTATING STATE DETECTION APPARATUS USING A PLURALITY OF LIGHT BEAMS

This application is a continuation of application Ser. No. 883,052 filed on July 8, 1986, now abandoned.

BACKGROUND OF THE INVENTION

1. Field of the Invention

The present invention relates to a rotating state detection apparatus and, more particularly, to an apparatus which photoelectrically detects a rotational speed and angle of a rotating object by utilizing a beam diffracted by a diffraction grating, and which is suitable for e.g., a rotary encoder.

2. Related Background Art

Photoelectric rotary encoders are conventionally used as a means for detecting a rotational speed and variations therein of rotating mechanisms in office equipment, such as a floppy-disk drive computer and a printer, an NC machine tool, the capstan motor of a VTR, a rotating drum, and the like.

A method which adopts a photoelectric rotary encoder employs a so-called index scale system wherein a light projection means and a light-receiving means are arranged to oppose each other with a main scale and a stationary index scale sandwiched therebetween. The main scale is formed by arranging light-transmitting and light-shielding portions at equal angular intervals at the peripheral portion of a disk coupled to a rotating shaft. The index scale is formed by arranging light-transmitting and light-shielding portions at the same angular intervals as in the main scale. According to this method, a signal in synchronism with the pitch of the adjacent light-transmitting and light-shielding portions of both scales can be obtained as the main scale is rotated. The obtained signal is subjected to frequency analysis to detect variations in the rotational speed of the rotating shaft. The smaller the pitch of the light-transmitting and light-shielding portions on both scales, the higher the detection precision. However, when the scale pitch is small, the S/N ratio of the output signal from a light-receiving means is degraded by diffracted light, resulting in low precision. In order to prevent this, if a total number of light-transmitting and light-shielding portions of the main scale is fixed, and the intervals between the two portions are increased to a point at which the light-receiving means is free from the effects of the diffracted light, the diameter and thickness of the disk of the main scale are increased, resulting in an increase in the overall apparatus size. Therefore, the object to be rotated is overloaded.

SUMMARY OF THE INVENTION

The present invention has been made in view of the above conventional drawbacks. It is a first object of the present invention to provide a rotating state detection apparatus in which the load acting on a rotating object is decreased and which can perform measurement at high precision.

It is a second object of the present invention to provide a rotating state detection apparatus which satisfies the first object and in which the influence of mounting eccentricity caused upon mounting a measurement diffraction grating on a rotating object is eliminated.

It is a third object of the present invention to provide a rotating state detection apparatus which satisfies the first and second objects and which can perform detection with stable precision regardless of an environmental change such as a vibration or a temperature change.

In order to achieve the above objects, the rotating state detection apparatus according to the present invention comprises an optical means for directing coherent beams toward a plurality of positions on a diffraction grating present along a rotational direction of a rotating object, an interfering means for superposing diffraction beams of a specific order with each other, the diffraction beams being diffracted at the plurality of different positions on the diffraction grating, and a light-receiving means for receiving the superposed beams obtained by the interfering means, wherein interference fringes are photoelectrically converted by the light-receiving means thereby detecting the rotating object.

In particular, when coherent beams are directed toward two points on the rotating object which are substantially symmetrical with each other at least with respect to the center thereof, the eccentricity between the center of the diffraction grating and that of the rotating object can be removed, thereby allowing a highly precise measurement.

When the lengths of the optical paths of the plurality of diffraction beams emitted by a light source are set to be the same, an optical system stable against external influences such as a temperature change and a vibration can be provided.

DETAILED DESCRIPTION OF THE PREFERRED EMBODIMENTS

Figure 1:
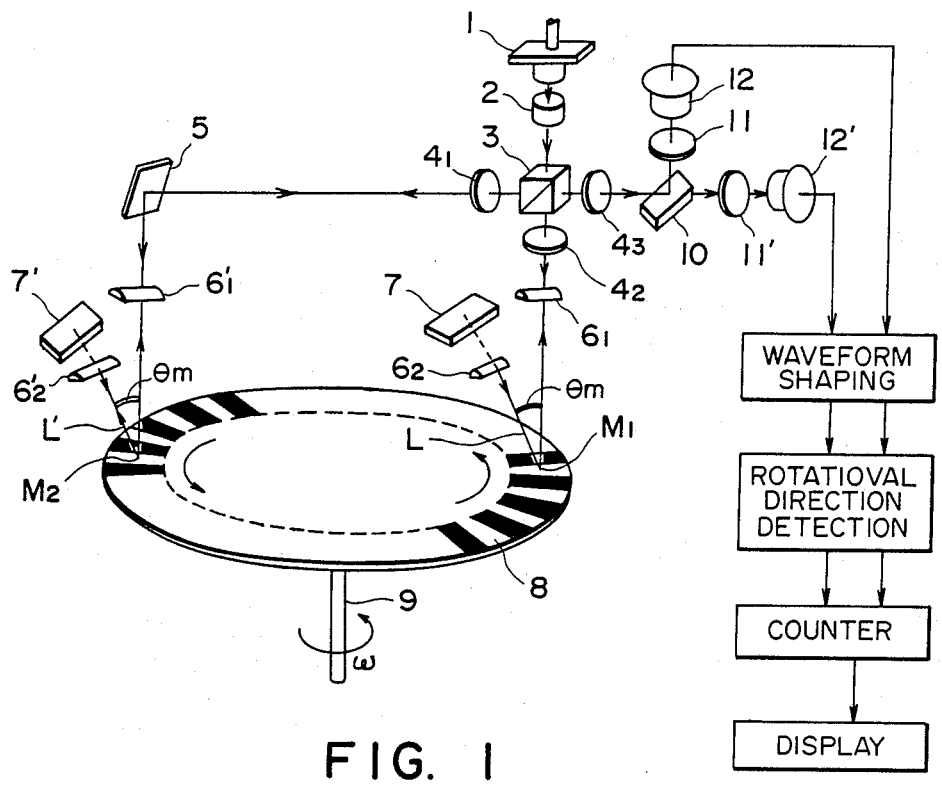
FIG. 1 is a schematic block diagram of a rotating state detection apparatus according to an embodiment of the present invention.

FIG. 1 is a schematic block diagram of a rotating state detection apparatus according to an embodiment of the present invention.

In FIG. 1, the apparatus has a coherent beam light source 1 such as a laser, a collimator lens 2, and a polarizing beam splitter 3. The polarizing beam splitter 3 is arranged such that its polarizing axis is inclined at 45° with respect to the linearly polarized light emitted by the laser 1. $\lambda/4$ plates $4_1$, $4_2$, and $4_3$ are arranged such that their polarizing axes are respectively inclined at 45° with respect to the linearly polarized light reflected and transmitted by the polarizing beam splitter 3. More specifically, the $\lambda/4$ plate $4_1$ is arranged such that its polarizing axis is inclined at 45° with respect to the direction of linear polarization of the beam reflected by the polarizing beam splitter 3. The $\lambda/4$ plate $4_2$ is arranged such that its polarizing axis is inclined at 45° with respect to the direction of linear polarization of the beam transmitted through the polarizing beam splitter 3. The $\lambda/4$ plate $4_3$ is arranged such that its polarizing axis is inclined at 45° with respect to either the direction of linear polarization of the beam transmitted through the polarizing beam splitter 3, or the direction of linear polarization of the beam reflected by the polarizing beam splitter 3. The apparatus also has a reflecting mirror 5, cylindrical lenses $6_1$, $6_2$, $6_1'$, and $6_2'$, and reflecting mirrors 7 and 7'. A radial grating 8 has grating patterns consisting of e.g., light-transmitting portions and light-reflecting portions at equal angular intervals arranged on a disk. A rotating shaft 9 of a rotating object (not shown), a beam splitter 10, and light-receiving elements 12 and 12' are also provided. Polarizing plates 11 and 11' are arranged such that their directions of polarization form an angle of 45° with respect to each other.

The beam emitted by the laser 1 is collimated by the collimator lens 2, and a substantially parallel beam obtained is incident on the polarizing beam splitter 3. The polarizing beam splitter 3 is arranged such that its direction of polarization is inclined at 45° with respect to the direction of linear polarization of the laser 1, and splits the beam from the laser 1 into a reflected beam and a transmitted beam of substantially the same intensity. The two split beams respectively pass the $\lambda/4$ plates $4_1$ and $4_2$ and are circularly polarized. Among them, the transmitted beam which passed the $\lambda/4$ plate $4_2$ is linearly incident on a position M1 of the radial grating 8 through the cylindrical lens $6_1$. The reflected which beam passed the $\lambda/4$ plate $4_1$ is linearly incident on a position M2 of the radial grating 8 through the reflecting mirror 5 and the cylindrical lens $6_1'$. The cylindrical lenses $6_1$ and $6_1'$ are arranged as needed to linearly guide the beam in a direction perpendicular to the radial direction of the radial grating 8. With this linear radiation, a pitch error of the diffraction grating, which consists of light-transmitting and light-reflecting portions on the radial grating 8 corresponding to the portion irradiated by the beam, can be decreased. The portions M1 and M2 on the radial grating 8 irradiated with the beams are set to be substantially symmetrical with respect to the center of rotation of a rotating object (not shown).

The beam incident on the radial grating 8 is reflected and diffracted by the diffraction grating patterns of the radial grating 8. The diffraction angle $\theta_m$ of the reflected diffraction beams L and L' of the mth order is represented by the following equation:

$$\sin \theta_m = m\lambda/p \tag{1}$$

where p is the pitch of the diffraction gratings at the portion irradiated with the beam, and $\lambda$ is the wavelength of the beam.

Assume that the radial grating 8 is rotated at an angular speed $\omega$. Then, a peripheral speed at the incident positions M1 and M2 is $v=r\omega$, where r is the distance from the center of rotation of the radial grating 8 to the incident positions M1 and M2.

Figure 2:
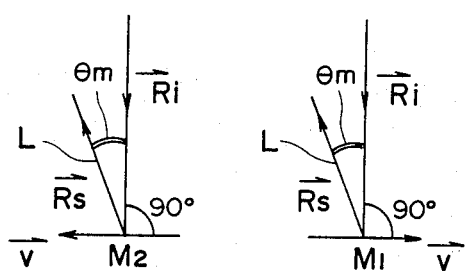
FIG. 2 is a vector diagram for explaining the relationship between a beam incident on the diffraction grating and a diffraction beam reflected thereby.

When the beam incident on the positions M1 and M2 is represented as $\overline{ki}$ in wave vector representation, the reflected diffraction beams L and L' are represented as $\overline{ks}$ and $\overline{k's}$ in wave vector representations, and the peripheral speed of the radial grating 8 at the positions M1 and M2 is represented as $\overline{v}$ by vector representation, their relationship is as shown in FIG. 2. Therefore, the frequencies of the reflected diffraction beams L and L' are subjected to so-called Doppler shift by amounts $\Delta f$ and $\Delta f'$, respectively, represented by equation (2):

$$\begin{aligned}\Delta f &= (\overline{ki} - \overline{ks}) \cdot \overline{v}/2 \\ &= v\sin\theta_m/\lambda \\ &= r\omega\sin\theta_m/\lambda \\ \Delta f' &= (\overline{ki} - \overline{k's}) \cdot \overline{v}/2\pi \\ &= -v\sin\theta_m/\lambda \\ &= -\Delta f\end{aligned} \tag{2}$$

Where . represents the vector inner product.

The beams are reflected by the reflecting mirrors 7 and 7' to be incident on the positions M1 and M2 again through the cylindrical lenses $6_2$ and $6_2'$. Then, the beams are diffracted again at the positions M1 and M2. In this case, these reflected diffraction beams of the mth order are subjected to Doppler shift again by the amounts represented by equation (2) and return to the initial optical paths. Therefore, the frequency of the beam which is re-diffracted at the position M1 and which returns to the initial optical path is subjected to Doppler shift by an amount $2\Delta f$, and the frequency of the beam which is re-diffracted at the position M2 and which returns to the initial optical path is subjected to Doppler shift by an amount $-2\Delta f$.

When the beam re-diffracted at the position M1 returns to the initial optical path and is transmitted through the $\lambda/4$ plate $4_2$ again, it is linearly polarized thereby such that its direction of linear polarization is rotated through 90° when compared to the original incident beam, and is reflected by the polarizing beam splitter 3. Similarly, when the beam re-diffracted at the position M2 returns to the initial optical path and is transmitted through the $\lambda/4$ plate $4_1$ again, it is linearly polarized thereby such that its direction of linear polarization is rotated through 90° when compared to the original incident beam, and is transmitted through the polarizing beam splitter 3. Thus, the beams rediffracted at the positions M1 and M2 are superposed on each other. After the superposed beam passes the $\lambda/4$ plate $4_3$ and is split by the beam splitter 10 into two beams, the beams are transmitted through the polarizing plates 11 and 11', and are incident on the light-receiving elements 12 and 12'.

In this manner, since the two beams subjected to Doppler shift of frequency by $2\Delta f$ and $-2\Delta f$ are superposed, the frequency of the output signals of the light-receiving elements 12 and 12' is: $2\Delta f - (-2\Delta f) = 4\Delta f$. More particularly, the frequency F of the output signals from the light-receiving elements 12 and 12' is: $F=4\Delta f=4f\omega\sin\theta_m/\lambda$. Substitution of equation (1) into this equation yields: $F=4mr\omega/p$. Since $p=r\Delta\Psi$ and $\Delta\Psi=2\pi/N$, $$F=2mN\omega/\pi \tag{3}$$

where N is the total number of the grating patterns on the radial grating 8 and $\Delta\Psi$ is the pitch of the equal angular intervals. Since $n=F\Delta t$ and $\theta=\omega\Delta t$, $$n=2mN\theta/\pi \tag{4}$$

where n is the number of waves of the output signal from the light-receiving element during a time $\Delta t$, and $\theta$ is the rotational angle of the radial grating 8 during the time $\Delta t$. As a result, the rotational angle $\theta$ of the radial grating 8 can be calculated in accordance with equation (4) by counting the number n of waves of the output signal from the light-receiving element.

It is preferable that the rotational direction be detected upon detection of the rotational angle. Therefore, in this embodiment, as is known in conventional photoelectric rotary encoders, a plurality of light-receiving elements are prepared and arranged such that the signals therefrom are 90° out of phase, and a signal representing the rotational direction is derived from the 90°-phase difference signals generated upon rotation.

In this embodiment, the 90°-phase difference between the output signals from the light-receiving elements 12 and 12' is obtained by a combination of a polarizing beam splitter, a [O/4 plate, and a polarizing plate. More specifically, the light beams re-diffracted at the positions M1 and M2 and returned to the initial paths are respectively reflected by and transmitted through polarizing beam splitter 3 to be superposed with each other, and are then transmitted through the [O/4 plate $4_3$ to provide linearly polarized light. The direction of the polarized light changes upon rotation of the radial grating 8. When the directions of polarization of the polarizing plates 11 and 11', which are respectively provided before the light-receiving elements 12 and 12', are shifted from each other by 45°, the 90°-phase difference is provided between the output signals from the light-receiving elements 12 and 12'. For example, as shown in FIG. 1, the output signals from the light-receiving signals 12 and 12' are subjected to waveform shaping to detect the rotational direction of the rotating object, and counted by the counter, thereby obtaining the rotational angle.

If this embodiment is adopted as a rotational speedometer which obtains only a rotational speed, the polarizing beam splitter 3 shown in FIG. 1 can be a half mirror, and the [O/4 plates $4_1$, $4_2$, and $4_3$, the polarizing plates 11 and 11', the beam splitter 10, and the light-receiving element 12 are not needed.

Figure 3:
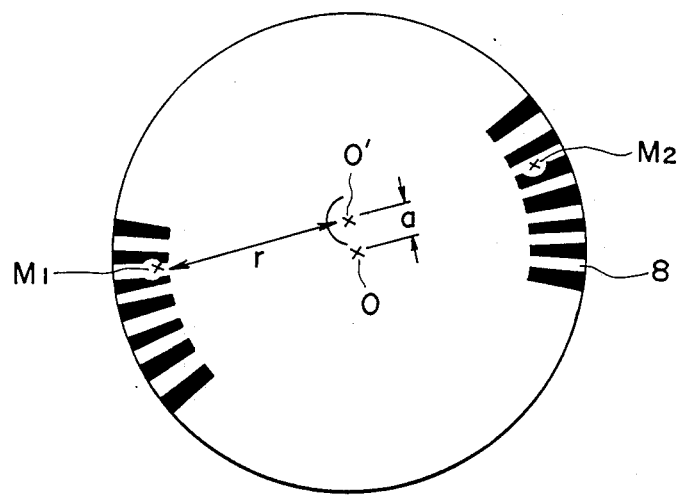
FIG. 3 is a view for explaining an eccentricity between the center of the radial grating and that of a rotating object which are used in the present invention.

FIG. 3 is a view for explaining the radial grating 8 shown in FIG. 1, incident positions M1 and M2 of the two beams on the radial grating 8, and the center of rotation of the rotating object.

In this embodiment, the two points of positions M1 and M2 that are substantially symmetrical with respect to the center 0 of the radial grating 8 and to the center of rotation 0' of the rotating object are set as the measurement points, in order to decrease the influence of the eccentricity between the center 0 of the radial grating 8 and the center of rotation 0' of the rotating object. More particularly, it is difficult due to mechanical difficulties to completely coincide the center 0 of the radial grating 8 with the center of rotation 0' of the rotating object, and a certain degree of eccentricity is inevitably present therebetween. For example, when an eccentricity a is present between the center 0 of the radial grating 8 and the center of rotation 0' of the object to be rotated, as shown in FIG. 3, the Doppler shift of frequency at the measurement point M1, which is distant from the center of rotation by r, changes from r/(r+a) to r/(r−a) when compared to the case wherein no eccentricity is present. Meanwhile, the Doppler shift of frequency at the measurement point M2, which is symmetrical to the position M1 with respect to the center of rotation, changes from r/(r−a) to r/(r+a) in the opposite manner to that at the position M1. Therefore, the two points M1 and M2 are measured simultaneously, thereby decreasing the influence of the eccentricity.

Figure 4:
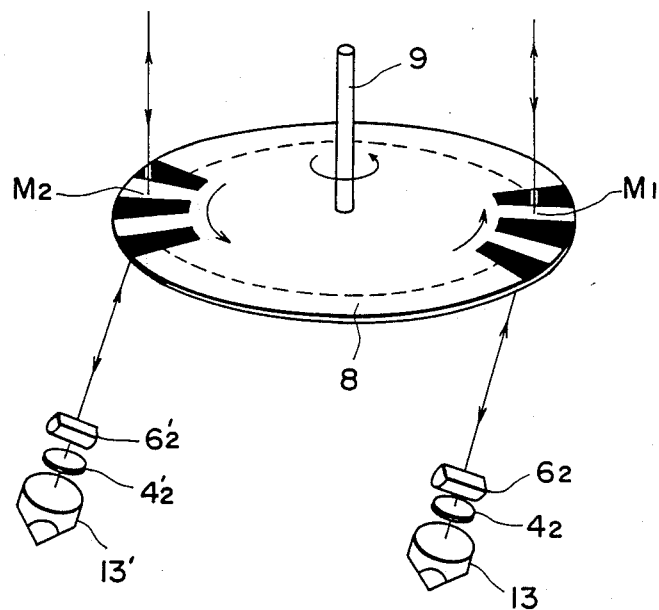
FIG. 4 is a partial view for explaining a modification of the rotating state detection apparatus shown in FIG. 1.

FIG. 4 is a partial perspective view of a rotating state detection apparatus according to another embodiment of the present invention, and shows portions of the radial grating 8 shown in FIG. 1 to which beams are incident. The same reference numerals in FIG. 3 denote the same elements as in FIG. 1. The transmitted diffraction beams of the ±mth orders, which are incident on the positions M1 and M2 on the radial grating 8, are incident again on the radial grating 8 through cylindrical lenses $6_2$ and $6_2'$, λ/4 plates $4_2$ and $4_2'$, and corner cube reflecting mirrors 13 and 13', in order to obtain the same effect as the embodiment shown in FIG. 1.

More particularly, the second embodiment utilizes a transmitted diffraction beam, whereas the first embodiment utilizes a reflected diffraction beam. Furthermore, in this embodiment, the corner cube reflecting mirrors 13 and 13' are used in place of usual reflecting mirrors, and reflect the beams diffracted at the positions M1 and M2 of the radial grating 8 to allow them to be constantly incident again in the vicinity of the positions M1 and M2. In other words, in this embodiment, even if the diffraction angles of the beams diffracted at the positions M1 and M2 of the radial grating 8 are changed due to the change in &he oscillation wavelength of the laser resulting from the ambient temperature change, the diffraction beams can be constantly returned to positions in the vicinity of the positions M1 and M2 because of the known characteristics of the corner cube reflecting mirrors. An optical element or an optical system other than a corner cube reflecting mirror can be constituted to have the same characteristics. With the arrangement having such characteristics, a semiconductor laser can be used as a light source, resulting in a decrease in size of the overall apparatus and in the manufacturing costs.

In the apparatus shown in FIGS. 1 to 4, the beams diffracted at the positions M1 and M2 of the radial grating 8 and respectively transmitted and reflected are incident again on the positions M1 and M2. However, the beams diffracted at the positions M1 and M2 of the radial grating 8 and respectively transmitted and reflected can be superposed with each other directly, so that interference fringes are obtained and detected by a light-receiving element. In this case, the two superposed beams are respectively diffracted only once and subjected to Doppler shift. Therefore, the output signal from the light-receiving element is: $\Delta f - (-\Delta f) = 2\Delta f$. Namely, the frequency F of the output signal from the light-receiving signal is : $F = 2\Delta f = 2r\omega \sin \theta_m/\lambda$, and equation (4) can be replaced by equation (4)':

$$n = mN\theta/\pi \tag{4'}$$

In the above embodiment, coherent beams are directly incident on the diffraction grating. However, the coherent beams can be incident on the diffraction grating through a reflecting mirror or the like. Alternatively, the entire optical system can be inclined by the diffraction angle of the diffraction beam or the diffraction angle of light of a specific order with respect to a plane of the diffraction grating, and the coherent beams can be obliquely incident on the diffraction grating.

As described in the above embodiment, when a laser or the like is used as a coherent beam light source, the beam therefrom often has predetermined polarizing characteristics. Therefore, when a polarizing beam splitter as a light splitter as well as a λ/4 plate and the like is also used with a specific consideration to its optical arrangement, the coherent beams emitted from the laser can be effectively utilized. For this reason, a polarizing beam splitter is preferably used as the beam splitter.

Figure 5:
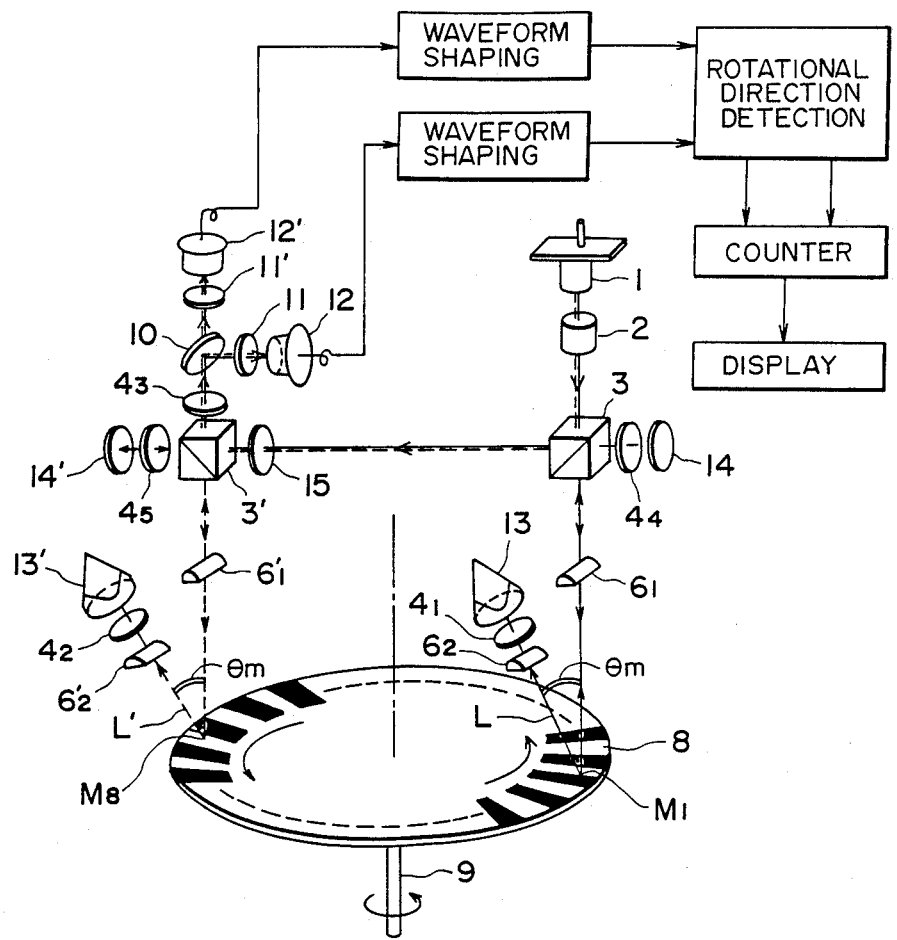
FIG. 5 is a schematic block diagram of a rotating state detection apparatus according to another embodiment of the present invention.

FIG. 5 is a schematic block diagram of a rotating state detection apparatus according to another embodiment of the present invention. In FIG. 5, the apparatus has a coherent beam light source 1 such as a laser, a collimator lens 2, and a polarizing beam splitter 3 as a beam splitting means. The polarizing beam splitter 3 is arranged such that its polarizing axis is inclined at 45° with respect to the direction of linear polarized light from the laser 1. The apparatus also has cylindrical lenses $6_1$, $6_2$, $6_1'$, and $6_2'$, $\lambda/4$ plates $f_1$, $4_2$, $4_3$, $4_4$, and $4_5$, reflecting mirrors 14 and 14', corner cube reflecting mirrors 13 and 13', a radial grating 8, and a rotating shaft 9 of a rotating object (not shown). The radial grating 8 is a diffraction grating obtained by arranging a plurality of grating patterns consisting of light-transmitting and light-transmitting portions at equal angular intervals on a disk. The apparatus also has a $\lambda/2$ plate 15, a beam splitter 10, polarizing plates 11 and 11', and light-receiving elements 12 and 12'. The polarizing plates 11 and 11' are arranged such that their direction of polarization are inclined at 45° with respect to each other.

The beam emitted by the laser 1 is collimated by the collimator lens 2. A substantially parallel beam obtained is then incident on the polarizing beam splitter 3. The polarizing beam splitter 3 is arranged such that its polarizing axis is inclined at 45° with respect to the direction of the linear polarization of the laser 1. Therefore, the beam 1 from the laser 1 is split by the polarizing beam splitter 3 into a reflected beam and a transmitted beam of substantially the same light intensity. Among them the transmitted beam is linearly incident at a position M1 on the radial grating 8 through the cylindrical lens $6_1$ as a first radiation means. The reflected beam is linearly polarized by the $\lambda/2$ plate 15 such that its direction of polarization is rotated through 90° from the beam before polarization, is transmitted through the polarizing beam splitter 3', is converted into circularly polarized light by the $\lambda/4$ plate $4_5$, is reflected by the reflecting mirror 14', and passes through the $\lambda/4$ plate $4_5$ again to become a linearly polarized beam perpendicular to the beam incident on the polarizing beam splitter 3'. This beam is then reflected by the polarizing beam splitter 3', and is linearly incident, through the cylindrical lens $6_1$, as a second radiation means, on a position M2 of the radial grating 8 substantially symmetrical to the point M1 thereon with respect to the center of rotation thereof. The cylindrical lenses $6_1$ and $6_1'$ are arranged so as to perform linear radiation in directions perpendicular to the radial direction of the radial grating 8. With this linear radiation, the influence of a pitch error of the light-transmitting and light-reflecting portions on the radial grating 8, which corresponds to the portion irradiated with the beam, can be decreased. The beam incident on the radial grating 8 is diffracted and reflected by the diffraction grating of the radial grating 8.

The diffraction angle $\lambda_m$ of the reflected diffraction beams L and L' of the mth order can be represented by equation (1) described above, where is the pitch of the grating patterns at the incident portion of the beam. Assume that the radial grating 8 is rotated at an angular speed $\omega$, and that peripheral speed at the incident positions M1 and M2 is $v = r\omega$, where r is the distance from the center of rotation of the radial grating 8 to the incident position M1 and M2. Assuming that the beam incident on the positions M1 and M2 is represented as kl in wave vector representation, the reflected diffraction beams L and L' are represented as ks and k's in wave vector representations, and the peripheral speed of the radial grating 8 at the positions M1 and M2 is represented as $\vec{v}$ in vector representation, the relationship among $\vec{k_i}$, $\vec{k_s}$, $\vec{k_s}'$, and $\vec{v}$ is as shown in FIG. 2. Therefore, the frequencies of the reflected diffraction beams L and L' are subjected to so-called Doppler shift by amounts $\Delta f$ and $\Delta f'$, respectively, represented by equation (2) described above.

The beam reflected by a first optical means comprising the corner cube reflecting mirror 13 is incident on the point M1 again through the cylindrical lens $6_2$ and the $\lambda/4$ plate $4_1$. Similarly, the beam reflected by a second optical means comprising the corner cube reflecting mirror 13' is incident on the point M2 again through the cylindrical lens $6_2'$ and the $\lambda/4$ plate $4_2$.

In this case, these beams of the mth order which are reflected and diffracted at the positions M1 and M2 are subjected to Doppler shift again by the amounts represented by equation (2) and return to the initial optical paths. As a result, the frequency of the beam R1 which is re-diffracted at the point M1 and which returns to the initial optical path is subjected to Doppler shift by an amount $2\Delta f$, and the frequency of the beam R2 which is re-diffracted at the point M2 and which returns to the initial optical path is subjected to Doppler shift& by an amount of $-2\Delta f$.

In this manner, the beam R1 is re-diffracted at the point M1 through the $\lambda/4$ plate $4_1$ and returns to the initial optical path. Therefore, the beam R1 becomes linearly polarized light having a direction of polarization perpendicular to the direction of polarization of the incident beam, and is reflected by the polarizing beam splitter 3. The beam R1 is then reflected by the reflecting mirror 14 through the $\lambda/4$ plate $4_4$ and passes through the $\lambda/4$ plate $4_4$ again. Then, the polarizing direction of the beam R1 is rotated through 90° again by the $\lambda/4$ plate $4_4$ and is transmitted through the polarizing beam splitter 3. The direction of polarization of the beam R1 is further rotated through 90° by the $\lambda/2$ plate 15, and is reflected by the polarizing beam splitter 3'. Meanwhile, the beam R2 is re-diffracted at the point M2 through the $\lambda/4$ plate $4_2$ and returns to the initial optical path. Therefore, the beam R2 becomes linearly polarized light having a direction of polarization perpendicular to the direction of polarization of the incident beam, and is transmitted through the polarizing beam splitter 3'. Then, the two beams R1 and R2 re-diffracted at the points M1 and M2 are guided to a position P on the polarizing beam splitter 3' by first and second light-guide means, respectively, and are superposed with each other. The superposed beam is passed through the $\lambda/4$ plate $4_3$, and is split into two beams by the beam splitter 10. The split beams are incident on the light-receiving elements 12 and 12' through the polarizing plates 11 and 11'.

In this manner, since the two beams R1 and R2 subjected to Doppler shift of frequency by $2\Delta f$ and $-2\Delta f$ are superposed, the frequency of the output signals of the light-receiving elements 12 and 12' is: $2\Delta f - (-2\Delta f) = 4\Delta f$. More particularly, the frequency F of the output signals from the light-receiving elements 12 and 12' is: $F = 4\Delta f = 4f\omega \sin\theta_m/\lambda$. Substitution of equation (1) into this equation yields: $F = 4mr\omega/p$. Since $n = F\Delta t$ and $\theta = \omega\Delta t$, equations (3) and (4) described above are obtained where N is the total number of the grating patterns on the radial grating 8, $\Delta\Psi$ is the pitch of the equal angular intervals, n is the number of waves of the output signal from the light receiving element during a time $\Delta t$, and $\theta$ is the rotational angle of the radial grating 8 during the time $\Delta t$. As a result, the rotational angle $\theta$ of the radial grating 8 can be calculated in accordance with equation (4) by counting the number n of waves of the output signal from the light-receiving element.

It is preferable that the rotational direction be detected upon detection of the rotational angle. Therefore, in this embodiment, as in the first embodiment and as is known in conventional photoelectric rotary encoders, a plurality of light-receiving elements are prepared and arranged such that the signals therefrom are 90° C. out of phase, and a signal representing the rotational direction is derived from the 90°-phase difference signals generated upon rotation.

In this embodiment, the 90°-phase difference between the output signals from the light-receiving elements 12 and 12′ is obtained by a combination of a polarizing beam splitter, a $\lambda/4$ plate, and a polarizing plate. More specifically, the light beams re-diffracted at the positions M1 and M2 and returned to the initial paths are respectively reflected by and transmitted through polarizing beam splitter 3′ to be superposed with each other, and are then transmitted through the $\lambda/4$ plate 9 to provide linearly polarized light. The direction of the polarized light is changed upon rotation of the radial grating 8. When the directions of polarization of the polarizing plates 11 and 11′, which are respectively provided before the light-receiving elements 12 and 12′, are shifted from each other by 45°, the 90°-phase difference is provided between the output signals from the light-receiving elements 12 and 12′. For example, as shown in FIG. 1, the output signals from the light-receiving signals 12 and 12′ are subjected to waveform shaping to detect the rotational direction of the rotating object, and counted by the counter, thereby obtaining the rotational angle.

If this embodiment is adopted as a rotational speedometer which obtains only a rotational speed, the polarizing beam splitter 3 shown in FIG. 1 can be a half mirror, and the $\lambda/4$ plates $4_1$, $4_2$, $4_3$, $4_4$, and $4_5$, the polarizing plates 11 and 11′, the beam splitter 10, and the light-receiving elment 12 are not needed.

In this embodiment, the laser 1 as the light source is preferably a semiconductor laser since a semiconductor laser is small in size, low in price, and has a high output. The wavelength of a semiconductor laser changes in accordance with the ambient temperature change. When the wavelength of the laser changes, the diffraction angle $\theta_m$ changes, as apparent from equation (1) representing diffraction conditions. Furthermore, when an eccentricity is present between the center of the radial grating 12 and the center of the rotating object, the pitch p of the grating patterns at the measurement points M1 and M2 changes. As a result, the diffraction $\theta_m$ also changes, as apparent from equation (1) representing diffraction conditions. However, in this embodiment, the corner cube reflecting mirrors 13 and 13′ (shown in FIG. 4) are used as the reflecting mirrors for the diffraction beams L and L′. Therefore, even if the diffraction angle $\theta_m$ changes, the beams reflected by the corner cube reflecting mirrors 13 and 13′ always return to the initial optical path. In short, errors caused by the change in the wavelength of the light source or the eccentricity due to the change in the diffraction angle are removed by the corner cube reflecting mirrors 13 and 13′.

In this embodiment, the length of the optical path extending from the laser 1 and reaching the light-receiving elements 12 and 12′ through the incident position M1 and the corner cube reflecting mirror 13, i.e., the first optical path (indicated by a solid line in FIG. 5), and the length of the optical path extending from the laser 1 and reaching the light-receiving elements 12 and 12′ through the incident position M2 and the corner cube reflecting mirror 13′ i.e., the second optical path (indicated by a dotted line in FIG. 5), are optically the same, thus providing a so-called common path interferometer. Therefore, the system is stable against external influences such as a vibration or a temperature change.

In the embodiments described above, two diffraction beams of the mth order are used. However, two diffraction beams of $\pm$mth orders or of different orders can be used.

The diffraction grating used in the embodiments consists of light-transmitting and light-reflecting portions. However, so-called amplitude-type diffraction gratings which include diffraction gratings consisting of light-transmitting and light shielding portions can be adopted. Furthermore, so-called phase-type diffraction gratings consisting of uneven relief patterns or gradient reflective indexes, and holograms can also be adopted. A phase-type diffraction grating, more particularly, a diffraction grating having a relief pattern can be obtained on a mass-production line, and is thus suitable for the present invention from an economical view point.

Since the phase-type diffraction grating has a higher diffraction efficiency than an amplitude-type diffraction grating, it can increase the light use efficiency of the laser light, and can use an inexpensive light-receiving element having a low-output laser and/or low sensitivity. In other words, a high-sensitivity, high-precision rotating state detection apparatus can be provided. Furthermore, in view of a further increase in the diffraction efficiency, a brased diffraction grating or a volume hologram that can increase the intensity of the diffraction beam of a specific order is also suited.

According to the present invention, interference fringes formed by interference between the diffraction beams obtained from two positions of a radial grating substantially symmetrical to each other with respect to its center is used, in order to remove the eccentricity between the center of the rotating object and the center of the radial grating. It must be noted that the condition of the substantial symmetry of the two points with respect to the center is most preferably employed when measurement precision is to be increased. Depending upon the specifications of a specific apparatus used, the eccentricity can be removed to a certain degree only by utilizing the diffraction beams obtained from a plurality of different points. As described above, a method can be employed wherein two diffraction beams diffracted at two different positions are allowed to interfere with each other. However, another method can also be employed wherein diffraction beams diffracted at three or more different points are allowed to interfere with each other and are superposed on each other The apparatus can be modified in accordance with the method employed.

In the embodiment shown in FIG. 5, a constitution of a common path interferometer is employed so as to provide an apparatus stable against external influences such as a vibration and a temperature change. The application of the common path interferometer in the system of the present invention is not limited to that shown in FIG. 5, but can be modified in any other manner provided that the first and second optical paths described above have the same lengths.

In the embodiments described above, linear radiation is obtained using a cylindrical lens for the purpose of decreasing the pitch error of the diffraction grating patterns. However, such linear radiation is not necessary depending on the specifications of a specific apparatus used.

According to the rotating state detection apparatus of the present invention, a small, high-precision rotary encoder wherein a rotating object is subjected to a small load and eccentricity between the center of the radial grating and the center of rotation of the rotating object is decreased can be achieved. When the apparatus has a constitution of a common path interferometer, a rotary encoder which is stable against external influences such as a vibration and a temperature change can be achieved.

In a conventional photoelectric rotary encoder employing an index scale system, the relationship corresponding to equation (4), among the number n of waves in an output signal from the light-receiving element, the total number N of the grating patterns of the main scale, and the rotational angle $\theta$, is:

$$n = N\theta/2\pi \qquad (5)$$

Therefore, the rotational angle $\Delta\theta$ per wave is:

$$\Delta\theta = 2\pi/N \text{ (radian)} \qquad (6)$$

In contrast to this, in this embodiment, $$\Delta\theta = \pi/2mN \text{ (radian)} \qquad (7)$$

from equation (4). Therefore, according to this embodiment, the detection of a rotational angle can be performed with a precision 4m times that of the conventional encoder, even if it uses a scale of the same split number as the conventional encoder.

In the conventional photoelectric rotary encoders, the lower limit of a gap between the light-transmitting and light-shielding portions is about 10 $\mu$m in view of the influence of the light diffraction.

When the rotational angle detection precision of, e.g., 30 seconds is to be obtained, the split number N of the main scale must be $N = 360 \times 60 \times 60/30 = 43,200$ from equation (6). When the gap between the light-transmitted and light-shielding portions at the outermost periphery of the main scale is 10 $\mu$m, the diameter of the main scale must be 0.01 mm $\times 43,200/\pi = 137.5$ mm.

In constrast to this, according to this embodiment, the split number of the radial grating can be $\frac{1}{4}$m to obtain the same rotational angle detection precision as the conventional encoder. When diffracted light of the orders of $\pm 1$ (m=1) is used, the split number of the patterns of the radial grating 8 can be 43,200/4 = 10,800 to provide a rotational angle detection precision of 30 seconds. The gap between the light-transmitting and light shielding portions can be small if a diffracted laser beam is used as in this embodiment. Therefore, if this gap is 4 $\mu$m, the diameter of the radial grating can be 0.004 mm $\times 10,800/\pi = 13.75$ mm. In other words, according to this embodiment, the diameter of the radial grating can be less than 1/10 that of the conventional one to obtain the same rotational angle detection precision as the conventional photoelectric rotary encoders employing the index scale system. As a result, the load acting on the rotating object becomes much smaller than in the conventional encoder, and accurate measurement can be performed.

What is claimed is:

1. A rotating state detection apparatus for detecting the rotation state if a rotating object having a diffraction grating formed along a rotational direction, said apparatus comprising:

optical means for directing coherent light beams to different positions of the diffraction grating, respectively, said different positions being arranged so as to be substantially symmetrical with each other about the rotational center of the rotating object;

interfering means for supporting diffraction light beams of respective predetermined orders emitted from said different positions, respectively; and light-receiving means for receiving the superposed light beams obtained by said interfering means to photoelectrically convert interference fringes formed by the superposed beams, wherein optical path lengths of the diffractions light beams of said predetermined orders extending from a light source are substantially, optically identical to each other.

2. An apparatus according to claim 1, wherein said diffraction grating comprises a grating radially formed having the rotational center of the rotating object as its center.

3. An apparatus according to claim 1, wherein said optical mean comprises a coherent beam light source and a beam splitter for splitting a beam emitted from said coherent beam light source into a plurality of beams.

4. An apparatus according to claim 3, wherein said coherent beam light source supplies linearly polarized light.

5. An apparatus according to claim 3, wherein said coherent beam light source comprises a semiconductor laser.

6. An apparatus according to claim 3, wherein said beam splitter comprises a polarizing beam splitter.

7. An apparatus according to claim 1, wherein said interfering means comprises a beam splitter for superposing the diffraction light beams of said predetermined orders, which are diffracted at the different positions on said diffraction grating, through a splitting surface thereof.

8. A rotating state detection apparatus for detecting the rotation state of a rotating object having a diffraction grating formed along a rotational direction, said apparatus comprising:

light source means for producing a coherent light beam;

light splitting means for dividing the coherent light beam into first and second light beams;

optical means for directing said first and second light beams to a first position of said diffraction grating and a second position thereof different from said first position, respectively, said first and second positions being arranged so as to be substantially symmetrical with each other about the rotational center of the rotating object;

interfering means for superposing diffraction light beams of respective predetermined orders emitted from said first and second positions, respectively; and light-receiving means for receiving the superposed beams obtained by said interfering means to photoelectrically convert interference fringes formed by the superposed beams, wherein optical path lengths of the diffraction light beams of said predetermined orders respectively extending from said light source means are substantially, optically identical to each other.

9. An apparatus according to claim 8, wherein said light-receiving means comprises means for discriminating a rotational direction of said rotating object.

10. An apparatus according to claim 9, wherein said light-receiving mean comprises a plurality of light-receiving sensors.

11. An apparatus according to claim 8, wherein the first and second beams are linearly incident on said diffraction grating, and a direction of a major axis of a spot of each of the first and second beams incident on said diffraction grating substantially corresponds to a rotational direction of said rotating object.

12. An apparatus according to claim 8, wherein said optical means comprises a pair of reflecting means, and diffraction beams of said predetermined orders are obtained by causing diffraction beams of specific orders, which are diffracted at said first and second positions, to be incident again on said first and second position on said diffraction grating by said pair of reflecting means, respectively.

13. An apparatus according to claim 12, wherein said reflecting means comprises corner cube reflecting mirrors.

14. An apparatus according to claim 13, wherein said corner cube reflecting mirrors have optical axes inclined by angles respectively corresponding to diffraction angles of the diffraction beams of said specific orders with respect to a plane of said diffraction grating.

15. A rotating state detection apparatus comprising:
optical means for directing coherent beams toward a plurality of positions on a diffraction grating located along a direction of rotation of a rotatable object;

interfering means for supporting with each other diffraction beams of specific orders emitted from said plurality of positions, such that light beam components of the diffraction beams of the specific orders on a first side of the center of rotation of the rotatable object are superposed with each other and such that light beam components of the diffraction beams of the specific orders on a second side of the center of rotation opposite the first side are superposed with each other; and light-receiving means for receiving the beams superposed by said interfering means, said light-receiving means photoelectrically converting interference fringes formed by the superposed beams, wherein said apparatus is constructed so as to equalize optical path lengths of the diffraction light beams.

16. An apparatus according to claim 15, wherein the diffraction beams of said specific orders are those of $\pm 1$ orders, respectively.

17. An apparatus according to claim 16, wherein the optical paths of the diffraction light beams of said $\pm 1$ orders respectively extending from a light source are substantially, optically identical to each other.

18. An apparatus according to claim 16, wherein said positions where the diffraction light beams of said $\pm 1$ order are substantially symmetrical with each other with respect to the rotational center of said rotating object.

19. A method for detecting the rotation state of a rotating object having a diffraction grating formed along a rotational direction, said method comprising the steps of:
directing coherent light beams to a first position of the diffraction grating and a second position thereof different from said first position, respectively, said first and second positions being arranged so as to be substantially symmetrical with each other about a rotational center of the rotating object; and photoelectrically converting interference fringes formed by a first diffraction beam emitted from said first position and a second diffraction beam emitted from said second position so as to detect the rotation state of the rotating object, wherein optical path lengths of said first and second diffraction beams respectively extending from a light source are substantially, optically identical to each other.

20. A method according to claim 19, wherein said first diffraction beam has $\pm 1$ order and said second diffraction beam has $-1$ order.

21. A method according to claim 20, wherein the rotational amount and rotational direction of said rotating object are detected based on a signal obtained in said photoelectric converting step.

22. A method according to claim 19, wherein said interference fringes are formed by superposing light beam components of said first and second diffraction beams on a first side of the rotational center of the rotating object with each other and superposing light beam components of said first and second diffraction beams on a second side of the rotational center opposite the first side with each other.

23. A method according to claim 22, wherein the optical paths of said first and second diffraction beams respectively extending from a light source are substantially, optically identical to each other.

24. A method according to claim 23, wherein the rotation amount and rotational direction of the rotating object are detected based on a signal obtained in said photoelectric converting step.

25. A method according to claim 19, wherein said directing step includes a step preparing a laser and a step of dividing a coherent light from the laser into first and second light beams, and said first and second light beams are directed to said first and second positions, respectively.

26. A method according to claim 25, further comprising a step of respectively converting said first and second light beam into a linear light beams each having a linear cross-sectional shape extending tangentially to the rotating body at said first or second position.

27. A method according to claim 25, wherein said dividing step is performed by a light splitting element, and said light splitting element also acts at superpose said first and second diffraction beams for forming the interference fringes.

28. A method according to claim 27, wherein the optical paths of said first and second diffraction beams respectively extending from a light source are substantially, optically identical to each other.

29. A method according to claim 25, wherein said first and second diffraction beams are formed by redirecting diffraction light beams, emitted from said first and second positions in said directing step, to said first and second positions by using first and second reflections systems, respectively.

30. A method according to claim 29, wherein said reflection system comprises a corner cube reflecting mirror.

31. A method according to claim 29, wherein the optical paths of said first and second diffraction beams respectively extending from a light source are substantially, optically identical to each other.

32. A method according to claim 31, wherein said first and second positions are substantially symmetrical with each other with respect to the rotational center of said rotating object.

33. A method according to claim 32, wherein the rotational amount and rotational direction of the rotating body are detected based on a signal obtained by said photoelectric step.

34. A method according to claim 19, wherein the rotational center is on an axis extending between said first and second positions and the distance between the rotational center and said first position is equal to that between the rotational center and said second position.

35. A rotating state detection apparatus comprising:
a rotating disc provided on a rotating object to be measured, a diffraction grating being formed on said disc along a rotational direction of said object;
optical means for directing light beams respectively to different positions on said diffraction grating, said different positions having a predetermined relation to reduce the influence based upon concentricity between a rotational center of said object and the center of said disc;
means for superposing the light beams emitting from each other of the different positions; and
light-receiving means for receiving the light beams superposed by said superposing means to photoelectrically convert interference fringes formed by the superposed light beams, wherein said apparatus is constructed so as to equalize optical path lengths of the first and second diffraction light beams.

36. A rotating state detection apparatus for detecting the rotation state if a rotating object having a diffraction grating formed along a rotational direction comprising:
optical means for directing a first light beam to a first position on the diffraction grating and a second light beam to a second position on the diffraction grating, said second position being substantially opposite with respect to the rotational center of the rotating object;
means for superposing a first diffraction light beam from the first position and a second diffraction light beam from the second position; and
light-receiving means for receiving the light beams superposed by said superposing means to photoelectrically convert interference fringes formed by the superposed light beams, wherein said apparatus is constructed so as to equalize optical path lengths of the first and second diffraction light beams.

37. An apparatus according to claim 36, further comprising:
first and second reflecting means, said reflecting means respectively reflecting the first and second diffraction light beams to the first and second positions, wherein said first and second diffraction light beam are rediffraction light beams generated at the first and second positions by said reflecting means.

38. An apparatus according to claim 36, wherein said optical means includes a laser and a beam splitter for forming the first and second light beams from light beams emitted from the laser, said beams splitter acting as said superposing means.

* * * * *

UNITED STATES PATENT AND TRADEMARK OFFICE
CERTIFICATE OF CORRECTION

PATENT NO. : 4,868,385

DATED : September 19, 1989

INVENTOR(S) : Tetsuhara Nishimura

It is certified that error appears in the above-identified patent and that said Letters Patent is hereby corrected as shown below:

FIGURE 1:

"ROTATIOVAL" should read --ROTATIONAL--.

COLUMN 2:

Line 39, "are" should read --is--.

COLUMN 3:

Line 24, "[O/4 plates" should read -- $\lambda/4$ plates--.

Line 28, "which" should be deleted.

Line 29, "beam" should read --beam which--.

COLUMN 5:

Line 14, "[O/4 plate," should read -- $\lambda/4$ plate,--.

Line 19, "[O/4 plate" should read -- $\lambda/4$ plate--.

Line 36, "[O/4 plates $4_1$, $4_2$, and $4_3$," should read -- $\lambda/4$ plates $4_1$, $4_2$, and $4_3$,--.

UNITED STATES PATENT AND TRADEMARK OFFICE
CERTIFICATE OF CORRECTION

PATENT NO. : 4,868,385
DATED : September 19, 1989
INVENTOR(S) : Tetsuhara Nishimura It is certified that error appears in the above-identified patent and that said Letters Patent is hereby corrected as shown below:

COLUMN 6:

Line 24, "&he" should read --the--.

COLUMN 7:

Line 25, "are" should read --is--.

Line 35, "them" should read --them,--.

Line 61, "diffraction angle $\lambda_m$" should read --diffraction angle $\theta_m$--.

Line 63, "is" should read --p is--.

COLUMN 8:

Line 2, "k1" should read --$\vec{k1}$--.

Line 4, "ks and k's" should read --$\vec{k}s$ and $\vec{k}'s$--.

Line 29, "shift&" should read --shift--.

UNITED STATES PATENT AND TRADEMARK OFFICE
CERTIFICATE OF CORRECTION

PATENT NO. : 4,868,385  
DATED : September 19, 1989  
INVENTOR(S) : Tetsuhara Nishimura Page 3 of 4

It is certified that error appears in the above-identified patent and that said Letters Patent is hereby corrected as shown below:

COLUMN 9:

Line 16, "C." should be deleted.

COLUMN 12:

Line 9, "if" should read --of--.

Line 18, "supporting" should read --superposing--.

Line 25, "diffractions" should read --diffraction--.

COLUMN 13:

Line 30, "position" should read --positions--.

COLUMN 14:

Line 29, "$\pm$ 1 order" should read --+ 1 order--.

Line 52, "step" should read --step of--.

Line 59, "beam into a" should read --beams into--.

Line 64, "at" should read --to--.

UNITED STATES PATENT AND TRADEMARK OFFICE
CERTIFICATE OF CORRECTION

PATENT NO. : 4,868,385

DATED : September 19, 1989

INVENTOR(S) : Tetsuhara Nishimura

Page 4 of 4

It is certified that error appears in the above-identified patent and that said Letters Patent is hereby corrected as shown below:

<u>COLUMN 15</u>:

Line 8, "tions" should read --tion--.

<u>COLUMN 16</u>:

Line 2, "other" should be deleted.

Line 10, "if" should read --of--.

Line 33, "beam" should read --beams--.

Line 38, "beams splitter" should read --beam splitter--.

Signed and Sealed this

First Day of October, 1991

Attest:

HARRY F. MANBECK, JR.

*Attesting Officer*     *Commissioner of Patents and Trademarks*